70

BEST AVAILABLE COPY

79

4 Sheets--Sheet 1.

G. CROMPTON.

Shedding Mechanisms for Looms.

No. 5,718. Reissued Jan. 6, 1874.

*Witnesses.*

My. McCaffuty.

H. M. Rice.

*Inventor.*

Geo Crompton.

AM. PHOTO-LITHOGRAPHIC CO. (OSBORNE'S PROCESS)

4 Sheets--Sheet 2.

G. CROMPTON.

Shedding Mechanisms for Looms.

No. 5,718. Reissued Jan. 6, 1874.

*Witnesses.*

M. McCaffuty.

H. M. Rice.

*Inventor.*

Geo Crompton

AM. PHOTO-LITHOGRAPHIC Co. N.Y. (OSBORNE'S PROCESS)

4 Sheets--Sheet 3.

G. CROMPTON.

Shedding Mechanisms for Looms.

No. 5,718. Reissued Jan. 6, 1874.

*Witnesses.*

M. McCaffuty.

H. M. Rice.

*Inventor.*

Geo Crompton

AM. PHOTO-LITHOGRAPHIC CO. N.Y. (OSBORNE'S PROCESS)

4 Sheets--Sheet 4.
G. CROMPTON.
Shedding Mechanisms for Looms.
No. 5,718. Reissued Jan. 6, 1874.
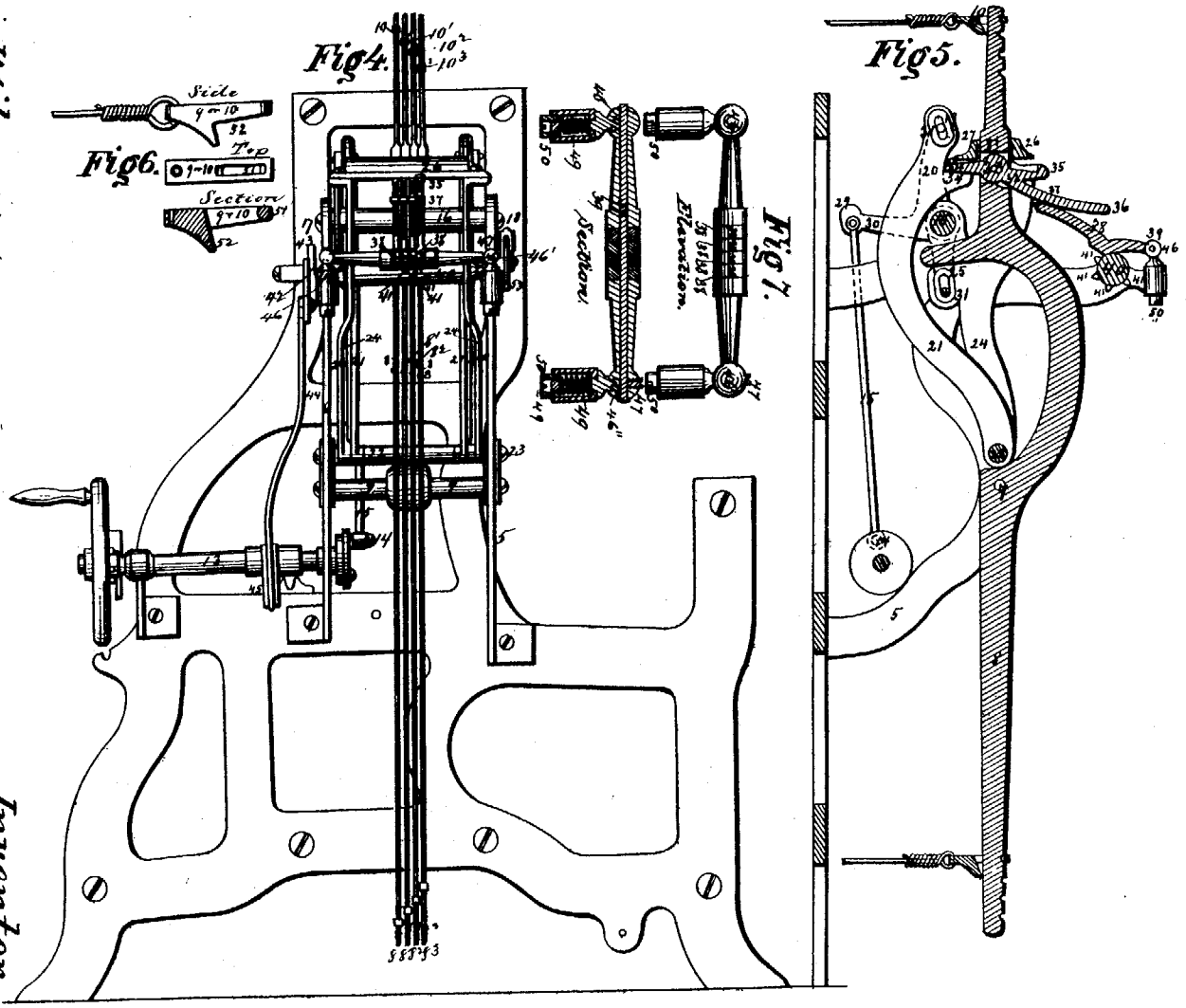
Witnesses.
M. McCaffaty.
H. M. Rice.
Inventor.
Geo Crompton.
A.M. PHOTO-LITHOGRAPHIC Co. N.Y. (OSBORNE'S PROCESS.)

UNITED STATES PATENT OFFICE.

GEORGE CROMPTON, OF WORCESTER, MASSACHUSETTS.

IMPROVEMENT IN SHEDDING MECHANISMS FOR LOOMS.

Specification forming part of Letters Patent No. 51,928, dated January 9, 1866; reissue No. 5,718, dated January 6, 1874; application filed May 17, 1869.

DIVISION A.

*To all whom it may concern:*

Be it known that I, GEORGE CROMPTON, of the city and county of Worcester, State of Massachusetts, have invented certain new and useful Improvements in Fancy-Looms; and I do hereby declare that the following is a full, clear, and exact description thereof, reference being had to the accompanying drawings and to the numbers of reference marked thereon, of which—

Figure 1:
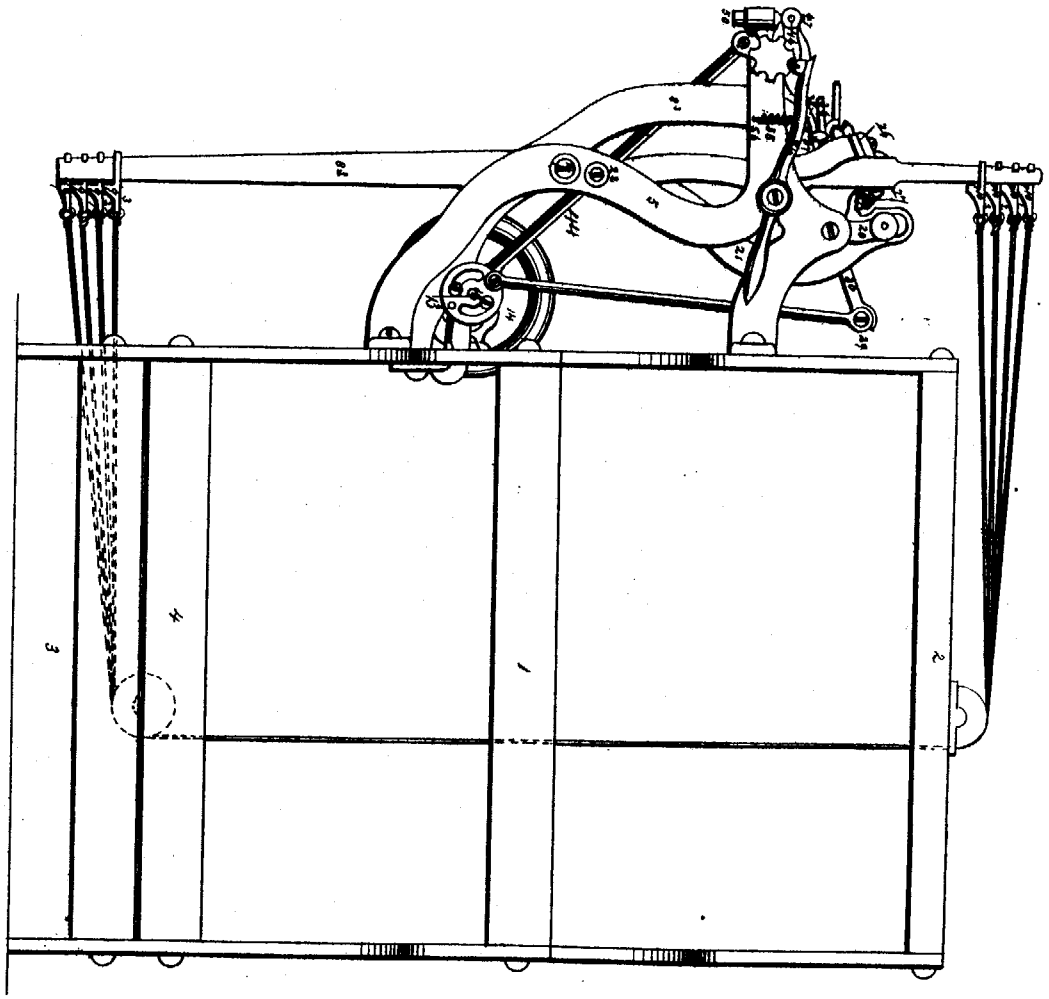
Figure 2:
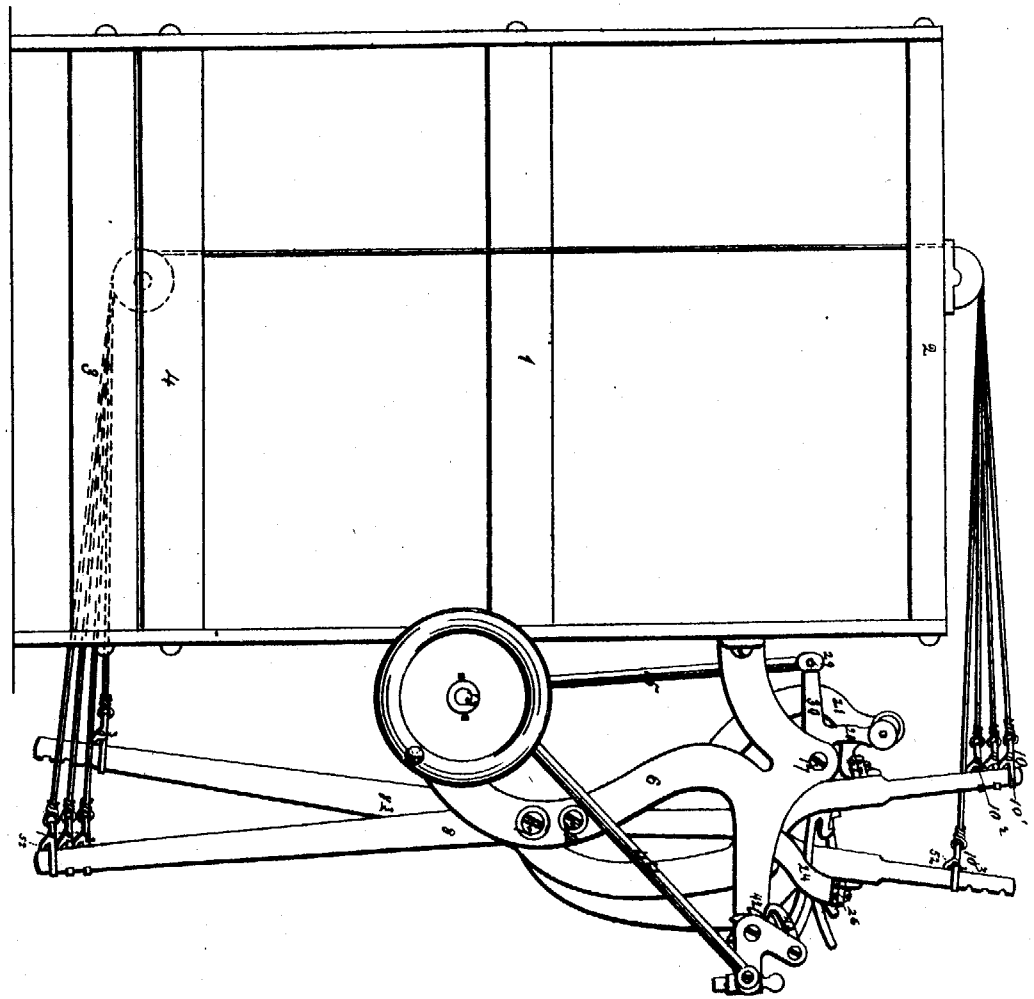
Figure 3:
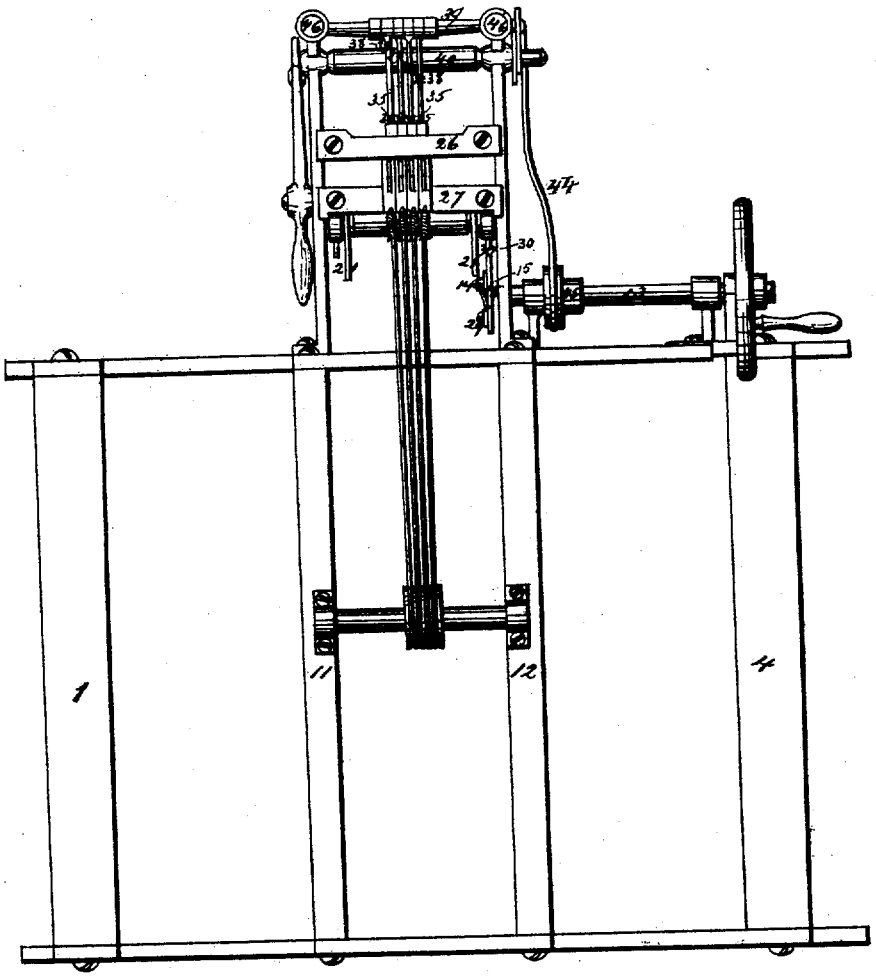

Figure 1 is a front elevation of a loom with my improvements applied. Fig. 2 is a rear elevation. Fig. 3 is a plan. Fig. 4 is an end elevation. Figs. 5, 6, and 7 are detached views.

The same numbers denote like parts in all the figures.

My improvements relate to the apparatus for operating the heddles and, through them, the warp of fancy-looms.

Looms were known before my invention having leaves of heddles, each connected, by suitable mechanism, with a double-hooked jack lying horizontally and moved on a pivot and against the force of gravity by a pattern chain or cylinder, (in order to determine the pattern by selecting those jacks to be moved in one direction from those to be moved in the opposite direction,) and moved endwise some in one direction and some in the opposite direction by reciprocating mechanism, (in order to form the shed,) but looms of this kind were liable to serious objections; and the first part of my invention relates solely to that class of looms with this description of double-hooked jacks, and consists in certain new arrangements and combinations of these jacks with other parts for the purpose of retaining all the advantages of this horizontal arrangement of these double-hooked pivoted jacks, while obviating the objections to which looms of this class are liable. Looms in which the leaves of heddles are connected by cords or wires passing over sheaves to upright levers whose motion moves the leaves of heddles, were also well known before my invention; and the second part of my invention consists in certain new arrangements and combinations of parts with these upright levers, whereby they, and consequently their leaves of heddles, are much more perfectly selected to form the pattern, and actuated to form the shed.

In the mechanism shown in the drawings, Fig. 1 represents the front elevation of a loom. To the left is attached the apparatus which gives motion to the heddles. 1 is the breast-beam, 2 2 are the top rails, 3 the front girths, and 4 the rear girth, by which the frame-work is held together in the ordinary manner. The subject of the improvement being exclusively the harness-motion, no lathe-shafting or other mechanism common to looms is represented. Sustained at each end by the side brackets 5 and 6 is the rod 7, which supports the four upright levers $8\ 8^1\ 8^2\ 8^3$. To the upper extremities of each of these levers are attached loop-like pieces of metal $10\ 10^1\ 10^2\ 10^3$, from which a series of cords leads over pulleys or sheaves on top rails 2 2, and which cords, passing down in a vertical line, are carried under another series of sheaves, and thence attached to the lower extremities of the vertical levers by loops $9\ 9^1\ 9^2\ 9^3$. In practice, the harness-frames are suspended by cords in the well-known way between the upper and lower series of sheaves, and through them the warp is drawn, neither of which, however, is represented. Fig. 1 represents the shed closed, as does also the sectional Fig. 5. 13 is a shaft, (which, in practice, is operated by bevel-gearing from the crank-shaft, which operates the lathe to which it is contiguous,) at one end of which is a crank, 14, which, by a connector, 15, gives an oscillating motion to a shaft, 16, having its bearings 17 and 18 in side brackets 5 and 6. Keyed upon each end of this shaft, inside its bearings, are double-armed levers 20 20, the upper ends of which play in slots 19 19 of the supporters 21 21, which are pivoted at 22, which is a rod extending from one side bracket to the other, and resting in them. From this rod rise two supporters, 24 24, similar to those already described, in each of which the lower ends of both double-armed levers play in slots 25 25. To the upper ends of these last-described supporters is secured a bar, 26, extending from one to the other. A similar bar, 27, is secured to the upper extremities of the first-described supporters. The rotation of the crank-pin 14, on the shaft 13, from its position in Fig. 1 will draw down the connecting-rod 15, connected to a horizontal arm, 30, and thus operate the supporters 21 21 and 24 24 and their respective bars 26 and 27, the latter being supported and guided by the former. In Fig. 5 one of the upright levers 8 is represented in longitudinal section taken through its edge. It will be seen that a mortise is made through this lever for the purpose of introducing a jack, 32, and sustaining it upon a pin, 33. Upon this jack are hooks 34 and 35, and its outer end, 36, passes through a mortise or cored slot, 37, in a small lever, 38, resting at 39. This last-named lever or finger lies on the periphery of the cylinder 40. When the jack is not raised its inner hook 34 is engaged with bar 27, and the outer hook 35 is below the range of the bar 26. As the bar 27 is moved inward it takes with it all the jacks which are not elevated by the action of the pins 41 of the pattern-cylinder on the fingers 38, and lowers the leaves of harness, with which they are connected. While the bar 26 is moved outward it engages with the hooks 35 of the jacks 32, which are elevated through the action of the pins 41 on the fingers 38, and, drawing them back, raises their leaves of harness and perfects the shed. One edge of each of the bars 26 and 27 acts, respectively, as lifter and depresser when making the shed, and on their return movement the other edges act as eveners, and bring all the jacks in position for a new distribution of their hooks by the cylinder. A pattern-chain is used in practice instead of the cylinder. When the shed is closed the chain or cylinder is moved by a catch-wheel, 42, and catch 43 by means of the connecting-rod 44 and eccentric 45 on shaft 13. The wheel 53 has depressions in which rest the rollers in lever 54, to which spring 55 is attached, and secured at 56 to check its momentum and to hold it in its place during the intermission of motion, at which time the series of projections and blanks uppermost on the chain or cylinder distribute the hooks to form the shed, each series of projections and blanks varying the pattern as required, (as is usual in looms of this class,) as represented in Figs. 1, 4, and 3. The rod 39 extends between, and is sustained at each end in, bearings 46, and secured by set-screws 47, and supports the fingers 38 38 38 38, which are pivoted upon it and lie upon the cylinder or chain. The bearings of the rod being kept down by spiral springs 48 48, through which bolts 49 49 pass, and the springs being compressed and retained by nuts 50 50, when the rod 39 is raised too far, so as to force the jack 32 against the unyielding lifter-bar, (as it would be by a pin which is too long, or by the untimely movement of the chain, as sometimes happens,) the springs 48 48 are contracted, and after the passage of the pin again expanded, and bring the bearings 46 46 down and return them upon their seats, as shown in Fig. 7. The loops 9 $9^1$ $9^2$ $9^3$ 10 $10^1$ $10^2$ $10^3$, attached to the lower and upper extremities of the heddle-levers, are shown at Fig. 5 enlarged in section, and also top and side views. These loops are so slotted as to snugly fit the extremities of the heddle-leaves, and are slightly rounded at the end of the slot 51 to fit any of the series of notches on the levers, and the spur 52, bearing upon the inner edge of the lever, prevents it from falling off the lower end, and from dropping down on the upper end of the levers. The leaves of heddles should be attached to the levers at varying distances from their fulcrums, so that the range of motion of the heddles shall vary somewhat, the front leaf commonly having the minimum and the rear leaf the maximum range of motion, although the angular motion of all the levers is the same. This is a matter well understood by all skilled in the art.

The main feature of the first part of my invention consists in the combination of these double-hooked jacks, when lying horizontally, and each pivoted to a part of the connection, between the jack and its leaf of heddles, with reciprocating bars, whose motion is crosswise to the motion of the heddles—that is, in such a direction as to move the horizontal jack endwise, so that these bars shall, when moving away from each other, carry with them their respective jacks, moving them endwise toward and from the side of the frame of the loom, and thereby opening the shed; and, when moving back, shall act upon the part to which the jacks are pivoted, thereby closing the shed and acting as eveners. This mechanism gives a steadiness to the motion of the heddles which is very desirable, and is very compact, simple, and little liable to get out of order.

I am aware that pivoted horizontal double-hooked jacks are old, (as before stated,) and also that they have been used in combination with reciprocating bars, which moved them endwise toward and from the side of the loom-frame to open the shed, but this combination, as heretofore used, was defective in that, on the return motion of these bars, they did not act upon the part on which the jacks were pivoted; and this latter action of these bars is the distinguishing feature of this part of my invention, and that which makes my combination of these parts superior to all other combinations of these bars with horizontal double-hooked jacks known to me.

On the other hand, I do not claim to be the first to use these reciprocating bars, on their return motion, as eveners, by causing them to act upon the part to which the jack is pivoted, as this is common in looms in which the double-hooked jacks are vertical; but the horizontal arrangements of these double-hooked jacks, so that they are moved by the pattern-chain against the force of gravity, and fall back into their places by that force, is much preferable, for many reasons, to the vertical arrangement, as is well known to all skilled in this art. And I do claim to be the first to thus use these reciprocating bars, on their return motion, as eveners, with double-hooked jacks arranged horizontally, and that, thereby, I have produced a very superior harness-motion.

The main feature of the second part of my invention consists in the combination of the upright levers with these horizontal double-hooked jacks. These upright levers and their cords, in combination with these double-hooked jacks, form a very desirable mechanism, by means of which the pattern-chain acts to select, and the lifter and depresser act to move, the leaves of heddles.

I am aware that these upright levers have been used with double-racked jacks, and also that double-hooked jacks have been used with horizontal levers, and also with three-armed levers; and I disclaim, therefore, all combinations of upright levers and jacks, unless the jacks have each two hooks, as distinguished from two series of teeth.

As all the claims to those features of my invention constituting what I have called the first part of it are for combinations in which three horizontal double-hooked jacks form one element, and as all the claims to those features of my invention constituting what I have called the second part of it are for combinations in which the upright levers form one element, nothing more need be said, so far as the claims relating to the first and second parts of my invention are concerned, than that I do not claim to be the inventor of any of the elements of any of the combinations claimed.

The third part of my invention consists in the direct combination of the jacks and horizontal fingers by making an orifice in one and passing a portion of the other through that orifice, as shown in the drawings.

I am aware of the arrangement of fingers, connecting-rods, springs, and jacks, described in patent to Burt, January 24, 1854; and disclaim it, limiting my claim to the direct combination of horizontal fingers and jacks without the intervention of connecting-rods.

The fourth part of my invention consists in supporting the finger on a yielding fulcrum, in order to relieve the strain when, from any accidental cause, the cylinder acts too soon, as before explained. Before my invention, these fingers were always supported by the pattern-chain and an unyielding fulcrum, no provision being made to correct the ill effect of their improper motion.

What I claim as my invention is—

1. The combination of a series of double-hooked pivoted jacks arranged horizontally, the parts to which the jacks are pivoted, and the reciprocating bars, in the manner described, so that the motion of the bars in opposite directions shall open the shed by acting upon the hooks of the jacks, and the motion of the bars, in returning, shall close the shed and control the heddles by acting upon the parts to which the jacks are pivoted, the whole combination being and operating substantially as described.

2. The combination of a series of double-hooked pivoted jacks arranged horizontally, the parts to which the jacks are pivoted, the reciprocating bars, the rock-shaft, and the arms secured upon the rock-shaft, the whole combination being and operating substantially as described.

3. The special combination of the series of double-hooked pivoted jacks, arranged horizontally, the parts to which the jacks are pivoted, and the reciprocating bars, formed by placing one of the bars on the right, and the other on the left, of the pivots of the jacks.

4. The series of upright vertical levers, substantially such as described, in combination, substantially in the manner described, with the series of double-hooked jacks, the whole combination being and operating substantially as specified.

5. The series of upright vertical levers, substantially such as described, in combination, substantially in the manner described, with the series of double-hooked jacks and the reciprocating bars, the whole combination being and operating substantially as specified.

6. The series of upright vertical levers, substantially such as described, in combination, substantially in the manner described, with the series of double-hooked jacks and the pattern mechanism, the whole combination being and operating substantially as specified.

7. The combination of jacks directly with the horizontal fingers, by causing a part of one to lie in an orifice in the other, in the manner described, so that the motion of the fingers, whether up or down, shall be imparted to the jacks.

8. The combination of jacks, horizontal fingers, and pattern mechanism, when the jacks are combined directly with the fingers, so that the protuberances upon the pattern mechanism shall actuate the jack by moving the finger upward, and the weight of the finger shall aid the jack in returning to its place when a blank in the pattern mechanism comes under the finger.

9. The combination of jacks, horizontal fingers, and levers, each attached to a leaf of heddles, when the jacks are combined directly with the fingers, and when the points of attachment of the heddles and levers are at different distances from the fulcrums of the levers, so as to give a varying range of motion to the heddles, substantially as above described.

10. Fingers provided with a yielding fulcrum, substantially in the manner and for the purpose specified.

GEO. CROMPTON.

Witnesses:
J. A. WARE,
F. A. HOWARD.